United States Patent [19]

Crocker, Jr.

[11] 3,938,256
[45] Feb. 17, 1976

[54] QUICK SETTLING GYROCOMPASS HAVING INTERAXIS DECOUPLING COMPENSATION FOR IMPROVED RESPONSE TIME

[75] Inventor: Earle B. Crocker, Jr., Pittsfield, Mass.

[73] Assignee: General Electric Company

[22] Filed: Feb. 16, 1972

[21] Appl. No.: 226,751

Related U.S. Application Data

[63] Continuation-in-part of Ser. No. 73,163, Sept. 17, 1970, which is a continuation-in-part of Ser. No. 701,690, Jan. 30, 1968, abandoned.

[52] U.S. Cl. ........................ 33/324; 33/318; 74/5.4
[51] Int. Cl. ............................................. G01c 19/38
[58] Field of Search ............ 33/324, 325, 326, 327, 33/318; 74/5.4

[56] References Cited
UNITED STATES PATENTS

| | | | |
|---|---|---|---|
| 2,976,618 | 3/1961 | Campbell | 33/324 |
| 3,279,086 | 10/1966 | Schlitt et al. | 33/324 |
| 3,280,642 | 10/1966 | Noxon | 74/5.4 |
| 3,346,966 | 10/1967 | Gates | 33/324 |
| 3,443,320 | 5/1969 | Boltinghouse et al. | 33/324 |
| 3,461,568 | 8/1969 | Kawada | 33/324 |
| 3,522,736 | 8/1970 | Hojo et al. | 33/327 |

*Primary Examiner*—William D. Martin, Jr.
*Attorney, Agent, or Firm*—Francis K. Richwine

[57] ABSTRACT

A quick settling, accurate gyrocompass for obtaining an accurate, short reaction time azimuth reference is described. The device preferably comprises a four gimbal configuration supporting a limited angle, two degree of freedom packaged gyroscope. The outer two gimbals of the arrangement are employed to provide a horizontal platform using accelerometers or pendulums as a reference to thereby comprise a stabilized platform. The inner two gimbals are employed to provide rotation about the two input axes of the gyro. The two degrees of freedom gyro and the inner two gimbals of the supporting structure thus comprised are connected to operate in a "North seeking" mode wherein the object is to align the gyro spin axis so that it is parallel to the spin axis of the earth. The gyro rotor is slaved to the gyro case about the gyro input axis so that if the rotor axis is not parallel to the earth axis a gyro error signal results in each input axis due to the rotation of the earth. These error signals are then used to drive the inner two gimbals until the errors are reduced to zero at which point (except for undesired effects) the gyro rotor spin axis will be parallel to the earth's spin axis thereby establishing the desired reference. Decoupling compensation circuits are employed for subtracting from the gimbal drive error signal supplied to the servo drive means of a particular axis, that component of the error signal which is due to gimbal rotation.

9 Claims, 9 Drawing Figures

INVENTOR
EARLE B. CROCKER JR.

BY J.F. McDeritt

HIS ATTORNEY

INVENTOR
EARLE B. CROCKER JR.

BY [signature: J.F. McDevitt]

HIS ATTORNEY

QUICK SETTLING GYROCOMPASS HAVING INTERAXIS DECOUPLING COMPENSATION FOR IMPROVED RESPONSE TIME

This application is a continuation in part of my application Ser. No. 73,163 filed Sept. 17, 1970 which in turn was a continuation in part of my application Ser. No. 701,690 filed Jan. 30, 1968, and abandoned Oct. 17, 1970.

BACKGROUND OF INVENTION

1. Field of Invention

This invention relates to a gyrocompass and to a new and improved technique and circuit for improving the settling time of a gyrocompass while maintaining its accuracy.

More particularly, the invention relates to a new and improved gyro compass employing a two-axis gyroscope and novel decoupling compensation circuit intercoupling the outputs of the two axes for eliminating the inherent cross coupling between the two axes to thereby improve the settling time of the gyrocompass without adversely affecting its accuracy.

2. Description of the Prior Art

Gyrocompasses have a fundamental trade off between settling time and alignment error due to erection error. This trade off becomes evident from a detailed analysis of the manner of operation of a gyrocompass. A common type of gyrocompass operates by sensing the rotation of the earth and aligning a gyro spin axis so that the component of the earth's rotation sensed by the gyro about an input axis is zero. It is the function of the erection system to provide a rigid coupling to the earth so that when the rate sensed by the gyro has be nulled, the gyro input axis is truly orthogonal to the earth's spin axis. If the erection system (i.e., the stabilized platform surface maintained parallel to the earth's surface that supports the gyroscope) is oscillating about the gyro input axis at frequencies below the first natural frequency of the system, the gyro will be misaligned by an angle sufficient to provide a component of earth's rate equal to the rate at which the erection system is oscillating in order that no rotations with respect to space be sensed by the gyro. The misalignment angle $\phi$ is given by $\phi = \theta W/W_e$ where $\theta$ is the magnitude of the erection error occuring at frequency $W$ and $W_e$ is earth's rate. Thus the transfer functions between alignment error and erection error $(\phi)/\theta$ must have a peak value at least as large as $W_N/W_e$, where $W_N$ is the first natural frequency of the system. Since settling time $T$ is inversely proportional to the lowest natural frequency, this ratio $W_N/W_e$ could be written $K/W_e T$. The tradeoff between alignment error due to erection errors occurring around the natural frequency of the system and settling time $T$ then becomes evident. For a system with a nominal settling time of 25 minutes, the ratio $W_N/W_e$ is 20. It should be noted at this point that the settling time $T$ here referred to is the total settling time for the two axis system using decoupling compensation networks to be descriped hereinafter.

The type of gyrocompass to which this invention can be applied may be described as an accurate, azimuth reference with short settling time and preferably would comprise a four-gimbal assembly supporting a limited angle two degree of freedom gyroscope. No particular gyroscope within the foregoing class would constitute a limitation on the execution of this invention. In fact, widely different types of two degree of freedom gyroscopes may be used in a gyrocompass according to this invention. For example, one might use a cryogenic gyroscope as disclosed by Buchhold, U.S. Pat. No. 3,044,309; an electrostatic gyroscope as disclosed by Boltinghouse, U.S. Pat. No. 3,443,320; a free rotor gyroscope, e.g., Autonetics G-6 Free Rotor Gyro; or a tuned rotor gyroscope, e.g., Litton G-2 Gyro also known as "Vibragimbal" or Singer, Kearfott Division, MITA-4 "Gyroflex" (Reg. T.M.). For that reason, the following references to a packaged gyro instrument represent any packaged two degree of freedom gyro having limited angular movement relative to its instrument casing and having signal and torque generators or pick offs for sensing and causing (respectively) angular motion of the gyro rotor with respect to the gyro instrument case. These generators include a signal generator and a torque generator for each of the two input axes which with the gyro rotor spin axis are the three orthogonal axes of the gyro. Angular motion about these two input axes, which may be referred to in either order as a first and second input axis, will cause motion of the spin axis relative to the gyro case. In this sense, the spin axis may be said to have two degrees of freedom (rotational) with respect to the gyro instrument case. In the exercise of this invention any packaged gyro to which the invention is applied must be mounted in a multi-axis gimbal assembly to provide the proper degrees of freedom. My description is based on use of a four gimbal assembly wherein the outer two gimbals of the four gimbal assembly are used only to provide a stabilized horizontal platform using accelerometers or pendulums as a reference although any other conventional method of establishing a stabilized platform could be used. The inner two gimbals of such four gimbal assembly are employed to control rotation of the packaged gyro about two axes of gyro and gimbal assembly which are the azimuth and latitude axes of that assembly. The assembly is connected in a "North seeking" mode wherein the object is to align the gyro rotor spin axis so that it is parallel to the spin axis of the earth. The gyro rotor spin axis is slaved to the gyro case by the torque generators as already noted so that the rotor spin axis is maintained in alignment with a spin reference axis fixed to the gyro case. If the rotor axis is not parallel to the earth spin axis, realignment could be accomplished either by moving the rotor spin axis relative to the case or by moving the case which is followed by the rotor relative to the earth. This invention contemplates doing the latter by moving the case about the inner two multi-axis gimbals of the gimbal assembly. In maintaining the rotor-to-case relationship, the signal and torque generators produce signals representing the alignment error between the gyro rotor spin axis and the earth's rotational axis. The signals produced are two error signals, each reflecting the angular error between the gyro rotor spin axis and the earth's rotational axis as seen about one of the two gyro input axes. These error signals are used to drive the inner two gimbals of said four gimbal assembly until the errors are reduced to zero (nulled). Except for undesired effects, the gyro rotor spin axis is then parallel to the earth's spin axis.

In the present invention only the inner two gimbals of the multi-axis gimbal assembly are considered except for the errors due to tilt of the horizontal reference (i.e., stabilized platform surface). It has been demonstrated that the basic and well known "North seeker" system briefly outlined above has a fundamental limitation in that its initial alignment settling time is in the order of days. It has been determined that this inherent slowness is due to the fact that with gyrocompassing taking place about two cross-coupled axes simultaneously, the gimbal rates being used in correction are indistinguishable from the earth's rates so that the system has to "wait" for the earth's rate components. The present invention makes available, for application to conventional gyro systems, a technique and circuits for compensating the error signals in the process of converting them to gimbal drive signals so as to remove the portion of the signals due to the motion of the gimbals and thereby reduce the settling time of the system so as to provide an accurate, short settling time azimuth reference within a time period of approximately 30 minutes.

SUMMARY OF INVENTION

It is therefore a primary object of the invention to provide an improved gyrocompass employing a 2° of freedom gyroscope connected in a "North seeking" configuration in combination with a novel decoupling compensation circuit interconnected between the error signal outputs of the two axes for eliminating inherent cross coupling between the two axes and thereby improve the settling time of the gyrocompass without adversely affecting its accuracy.

In practicing the invention, a quick settling, accurate gyrocompass is provided which includes a packaged gyroscope having two input axes about which motion takes place in aligning the spin (third orthogonal axis) of the gyroscope with the spin axis of the earth to establish an azimuth reference. The packaged gyroscope includes a rotor and an error signal generator and a torquing generator for each gyro input axis and is mounted on an external gimbal assembly having a servo drive system for moving the packaged gyro about each axis of freedom of the gimbal assembly. Torque signal amplifiers are operatively coupled between the error signal generator and the torque generator for each gyro input axis for feeding back input axis error signals to the torque generator with a polarity selected to bias the gyro rotor in a direction to maintain the alignment of the rotor with the spin reference axis of the gyro case so as to prevent an error signal due to any difference in alignment between the rotor spin axis and the case. Summing amplifiers are coupled to the output of each of the torque amplifiers for summing of the modified error signal with a compensation signal to eliminate the undesired effects of cross coupling. The output of each summing amplifier is connected to a gimbal servo drive circuit for deriving signals of suitable polarity and magnitude for rotating the proper external gimbal to null the gyro input axis error signals aligning the spin axis of the packaged gyro with the earth's spin axis. The proper pairing of gyro input axes and gimbal axes is set out in further detail in the following description of the preferred embodiment of the invention. The arrangement is completed by decoupling compensation circuits, one of which is interposed between the output of each summing amplifier and a second input of the other summing amplifier for subtracting a compensation signal from the modified error signal in each instance. Each compensation signal represents the portion of the rate of rotation of the packaged gyro about one input axis which is due to its corresponding gimbal rotation. In a preferred embodiment of the invention, the decoupling compensation circuits employ amplifiers having transfer functions given by the expression $$f(s) = \frac{K_1 K_2}{S + K_1}$$

Other objects, features and many of the attendant advantages of this invention will be appreciated more readily as the same becomes better understood by reference to the following detailed description, when considered in connection with the accompanying drawings, wherein like parts in each of the several figures are identified by the same reference character.

DETAILED DESCRIPTION OF PREFERRED EMBODIMENT

Figure 1:
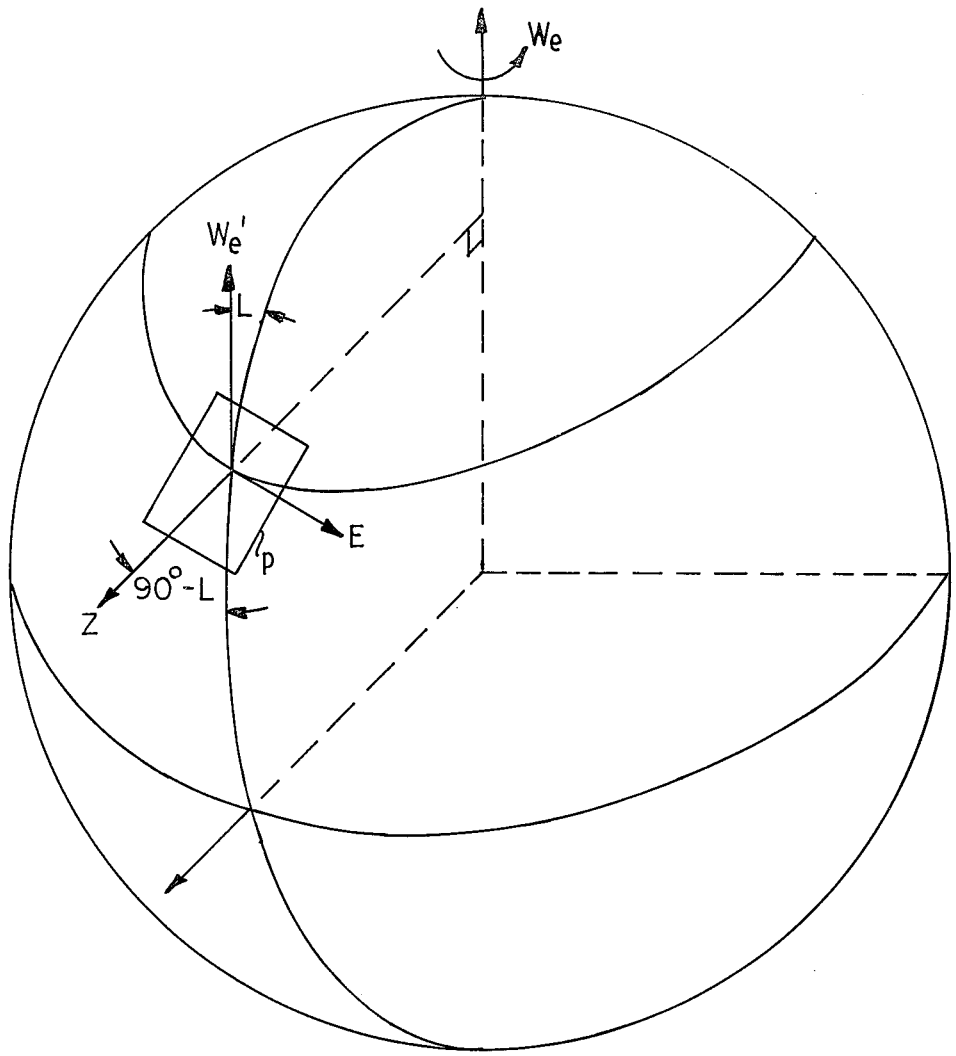
FIG. 1 is a diagrammatic sketch illustrating a point on the earth's surface where an azimuth reference is desired, and illustrating the principles upon which the gyrocompass comprising the present invention operates.
Figure 2:
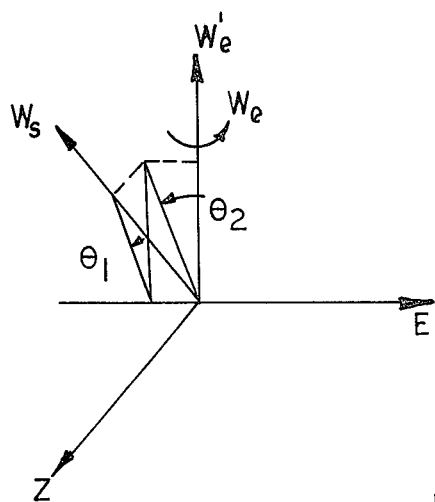
FIG. 2 is a vector diagram of the several angular error signals developed during operation of the gyrocompass comprising the invention.

A gyroscope is a rotating mass comprising a spin rotor enclosed in a case, means for torquing the rotor in order to maintain its spin axis at a given orientation along a spin reference axis fixed with respect to the case and means for determining any deviation from that orientation. Therefore, when this orientation is maintained, external torques applied to the case will move both the gyro case and the spin rotor in space. FIGS. 1 and 2 of the drawings show the coordinate system to be used in the following description. FIG. 1 illustrates the coordinate system with reference to the earth and the earth's spin axis $W_e$ which also corresponds to the earth's spin vector. ($W_e$ is used to indicate both the axis and the magnitude of the earth's rotational rate about that axis.) In FIG. 1, the line $W_e'$ is parallel to the earth's spin vector from the point 0 at which orientation would take place and is the desired orientation of the gyro spin axis. The Z axis through 0 is perpendicular to both $W_e$ and $W_e'$. The E axis through 0 completes orthogonal axes $W_e'$, Z and E and points to due East. These axes are fixed to the earth's surface and rotate about the earth's polar axis with the angular earth rate $W_e$. A horizontal reference plane containing point 0 would contain the axis E and would be normal to the local vertical V. The horizontal stabilized platform surface depicted by the rectangle P lies in that horizontal reference plane. North from the point 0 is the line in that horizontal plane which is also in the plane of axes Z, $W_e'$, V and $W_e$. This may also be stated as North in the line in the horizontal plane that is the projecti.. to that plane of $W_e'$. Latitude, which is the number of degrees from the equator can be measured by an angle L at the earth's center. The same angle appears at the point 0 between $W_e'$ and North.

FIG. 2 shows how the angles of the gyro rotor and the case about the axes defined in FIG. 1 are to be identified in the following description. $W_s$ is the spin vector of the gyro rotor. $\theta_1$ is the angular deviation of the gyro rotor spin axis about the E axis in a plane perpendicular to the E axis, and is measured positive with the right-hand rule. $\theta_2$ similarly is the angular deviation of the rotor spin axis about the Z axis in a plane perpendicular to the Z axis. The triangles with the vertices $\theta_1$ and $\theta_2$ have no common legs, and the corresponding gyro case angles with respect to the same $W_e'$, Z and E axes are identified as $\theta_{c1}$ and $\theta_{c2}$.

In order to understand the operation of the packaged gyro it is necessary to note that the desired orientation of the gyro rotor spin axis previously described is along $W_e'$ from point 0. That desired orientation also includes the condition that the gyro input axes are coincidental with axes Z and E.

The packaged gyro is equipped with a suitable pickoff or error signal generator for each gyro input axis which reads the difference between the spin reference axes of the case and the rotor axis angles. The packaged gyro as previously noted is also provided with torque generators for rotating the rotor about the same input axes in response to error signals. The difference error signals are defined by $$E_1 = \theta_{c1} - \theta_1 \qquad 1(a)$$
$$E_2 = \theta_{c2} - \theta_2 \qquad 1(b)$$

The error signals defined in equations (1a) and 1b) are employed to torque the gyro rotor to track case movement so that the case and gyro rotor spin axis are maintained in alignment and have the same angles ($\theta_{c1} = \theta_1$; $\theta_{c2} = \theta_2$). The error signals are simultaneously employed to drive the inner two gimbals of the external multiple gimbal assembly to cause the rotation of the packaged gyro about its input axes until the rotor and case angles are all zero indicating that the gyro spin vector lies along the $W_e'$ axis.

The equation relating the angular rates of the rotor about the input axes to the error signal supplied to the gyro torque generators are given by the expressions $$W_1'' = Tx/H'(s)E_1 \qquad (2a)$$
$$W_2'' = Tx/H'(s)E_2 \qquad (2b)$$

where $W_1''$ and $W_2''$ are the components of $\dot{\theta}_1$ and $\dot{\theta}_2$ due only to gyro torquing, H' is the angular momentum of the gyro rotor, and Tx is the transfer function of the torquers, assumed equal in both axes.

The transfer equations from the error signals supplied to the gimbal drives for nulling the case angles are denoted by the following expressions where symmetry of the two axis system is assumed $$\theta_{c1} = G(\;)E_2 \qquad (3a)$$
$$\theta_{c2} = G(s)E_1 \qquad (3b)$$

The case angles relative to the earth, $\theta_{c1}$ and $\theta_{c2}$, are obtained by combining $\theta_{c1}'$ and $\theta_{c2}'$ with the erection angle errors defining any misalignment of the horizontal stabilized platform with respect to the earth.

In order to better appreciate why the error signals indicating misalignment of case and rotor about one gyro input axis are used to drive the case about the other input axis (as indicated by expressions 3(a), 3(b)) in nulling the gyro rotor and case angles, the following discussion will be helpful. In FIG. 2 assume that initially the error angle $\theta_1$ is zero and $\theta_2$ has some value as would be the case when the $W_s$ vector is in the $W_e'$-E plane. The gyro spin vector $W_s$ tends to remain inertially fixed in space but because of the earth's rotation the coordinate system (E, Z, $W_e'$) is rotating about the $W_e'$ axis at the earth rate $W_e$. As a consequence of the rotation and $\theta_2$ having some value, $\theta_1$ will not remain at zero as time increases. The geometrical considerations for these small angles will show that the angles $\theta_1$ and $\theta_2$ are related by $$W_1' = -W_e \theta_2 \qquad (4a)$$
$$W_2' = W_e \theta_1 \qquad (4b)$$

where $W_1'$ and $W_2'$ are the components of $\dot{\theta}_1$ and $\dot{\theta}_2$ due only to earth's rotation. The total angular rate of rotation of the rotor about the gyro input axes is then given by the sum of the rates given by equations 2(a), 2(b), 4(a) and 4(b) as $$\dot{\theta}_{1T} = W_1'' + W_1' \qquad (5a)$$
$$\dot{\theta}_{2T} = W_2'' + W_2' \qquad (5b)$$

$\theta_1$ is given by the integral of 5(a) and $\theta_2$ is given by the integral of 5(b). Substituting 2(a), 2(b), 4(a) and 4(b)

into 5($a$) and 5($b$), using the integrals of 5($a$) and 5($b$) in 1($a$) and 1($b$), and switching to LaPlace transform notation yields the following expressions for the error signals $$E_1 = \frac{1}{S + Tx/H'}[S\theta_{c1} + W_e\theta_2] \qquad (6a)$$

$$E_2 = \frac{1}{S + Tx/H'}[S\theta_{c2} - W_e\theta_1] \qquad (6b)$$

without gimbal movement, the packaged gyro is tied to the earth and to the coordinate system E, Z, $W_e'$ of FIG. 2. Under these conditions $\theta_{c1}$ and $\theta_{c2}$ are constant ($S\theta_{c1} = S\theta_{c2} = 0$) and equation 6($a$) indicates that, in the steady state, the error signal derived from the signal generator measuring rotating of the rotor about gyro input axis 1 is proportional to the angle of the gyro rotor with respect to the desired orientation about gyro input axis 2. Similarly, equation 6($b$) indicates that, in the steady state, the error signal derived from the signal generator measuring rotation of the rotor about gyro input axis 2 is proportional to the angle of the gyro rotor with respect to the desired orientation about gyro input axis 1. Therefore, to obtain the desired orientation of the rotor, the gyro case is driven through the gimbal drives about gyro input axis 2 in response to a signal from the signal generator on gyro input axis 1 and about gyro input axis 1 in response to a signal from the signal generator on gyro input axis 2 in accordance with equations 3($a$) and 3($b$). The gyro rotor follows the case since it is slaved to the case through the gyro torque generators.

Figure 3:
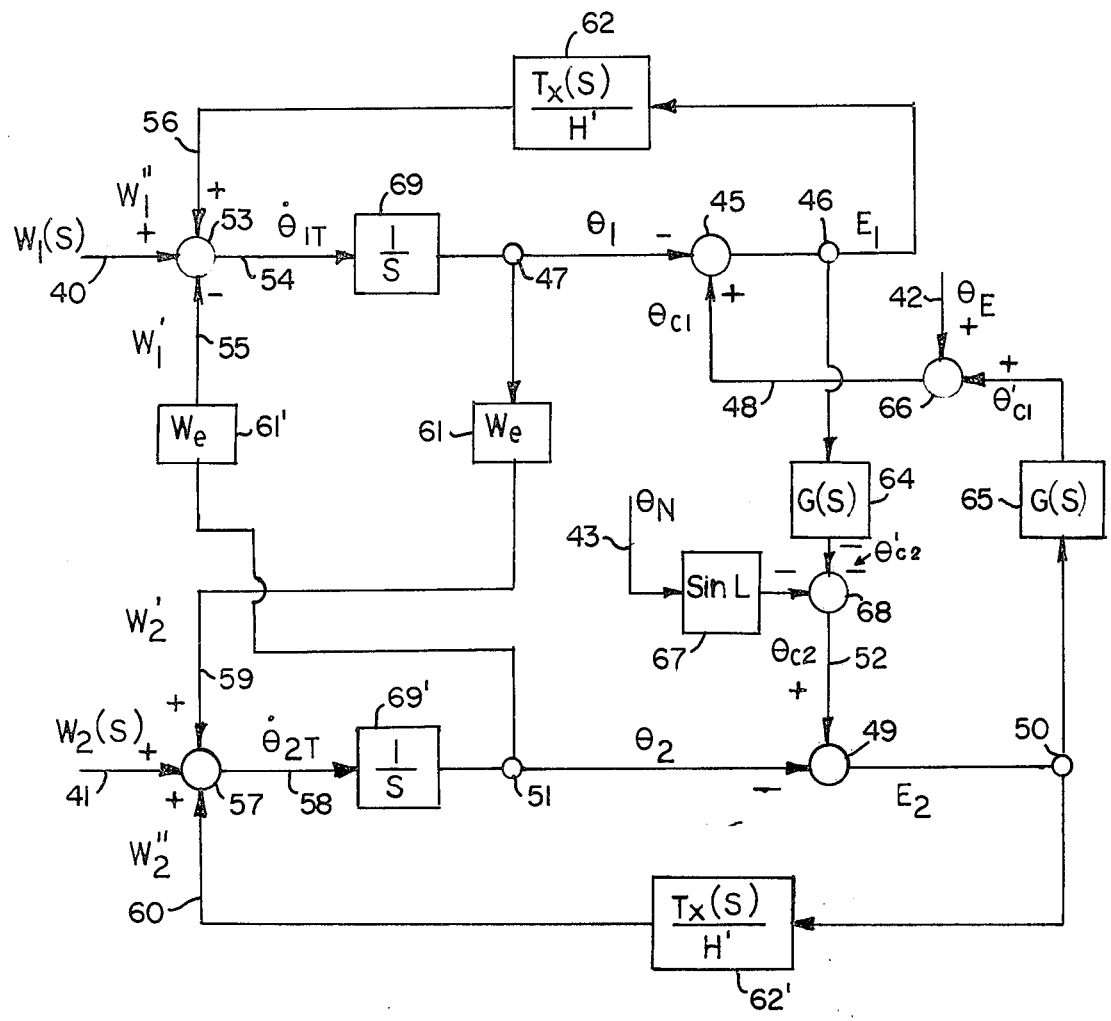
FIG. 3 is a functional block diagram of a model of a basic (prior art) "North seeking" gyrocompass system illustrating the basic signals and components comprising such system.

FIG. 3 of the drawings is a functional block diagram of a model of a basic "North seeking" gyrocompass system constructed in accordance with the expressions set forth in Equations 1 through 5 above and comprises an extension of standard and well-known gyrocompass techniques to a two axes system. In FIG. 3, the terms $W_1(s)$ and $W_2(s)$ inserted at 40 and 41 respectively represent gyro drift rates, and $\theta_E$ and $\theta_N$ inserted at 42 and 43 respectively are erection errors due to misalignment of the horizontal stabilized platform surface about East and North, respectively. In this configuration, a positive rotation $\theta_N$ of the packaged gyro at 0 (FIG. 1) about North produces a negative rotation about the Z axis. The summing junction 45 represents equation 1($a$) which indicates that the difference error signal $E_1$ at 46 is obtained by subtracting the rotor angle $\theta_1$ at 47 from the case angle $\theta_{c1}$ at 48. Similarly the summing junction 49 represents equation 2($a$) which indicates that the difference error signal $E_2$ at 50 is obtained by subtracting the rotor angle $\theta_2$ carried by line 51 from the case angle $\theta_{c2}$ carried by line 52. The summing junction 53 represents equation 5($a$) where the total angular rate of rotation of the rotor $\dot{\theta}_{1t}$ at 54 is produced by the sum of the rate due to earth's rotation $W_1'$ and the rate due to gyro torquing $W_1''$ available at 55 and 56 respectively. Similarly the summing junction 57 represents equation 5($b$) where the total rate of rotation of the rotor $\theta_{2T}$ at 58 is given by the sum of the rate of rotation due to earth's rotation $W_2'$ at 59 and the rate due to gyro torquing $W_2''$ at 60. $W_1'$ and $W_2'$ are obtained from equations 4($a$) and 4($b$) respectively by multiplying the appropriate rotor angles $\theta_1$ and $\theta_2$ by earth's rate $W_e$ at 61 and 61'. $W_1''$ and 56 and $W_2''$ at 60 are obtained from equations 2($a$) and 2($b$) respectively by multiplying the appropriate error signals $E_1$ and $E_2$ by the gyro torquer transfer function divided by gyro angular momentum as shown at 62 and 62'. The case angles $\theta_{c1}'$ and $\theta_{c2}'$ due to the gimbal drives are obtained from equations 3($a$) and 3($b$) by multiplying the appropriate error signals $E_1$ and $E_2$ by the gimbal drive transfer function $G(S)$ at 64 and 65 respectively. The case angle $\theta_{c1}$ at 48 is obtained by summing $\theta_{c1}'$ with the erection error angle $\theta_E$ in summing junction 66. In a like manner, the case angle $\theta_{c2}$ is obtained by summing $\theta_{c2}'$ with the erection error angle $\theta_N$ multiplied by Sin L at 67 in the summing junction 68.

The integrators 69 and 69' integrate the rotor angular rates $\dot{\theta}_{1T}$ and $\dot{\theta}_{2T}$ to yield the rotor angles $\theta_1$ and $\theta_2$ at 47 and 51. From a consideration of FIG. 3, it will be appreciated that due to the cross coupling of the two gyro input axes, even simple choices for the terms Tx and G in the gyro torquer and gimbal servo drive produce complicated closed loop transfer functions. However, choices for Tx and G can be made which result in a simple workable system. Such a choice is $$Tx(s)/H' = K_1 \qquad (7)$$
$$G(s) = K_2'/s \qquad (8)$$

since $K_1$ is a constant the input to $G(s)$ may be taken as $K_1E$ rather than $E$ if $G(s)$ is redefined as $$G(s) = K_2'/K_1 s = K_2/s \qquad (9)$$

Figure 4:
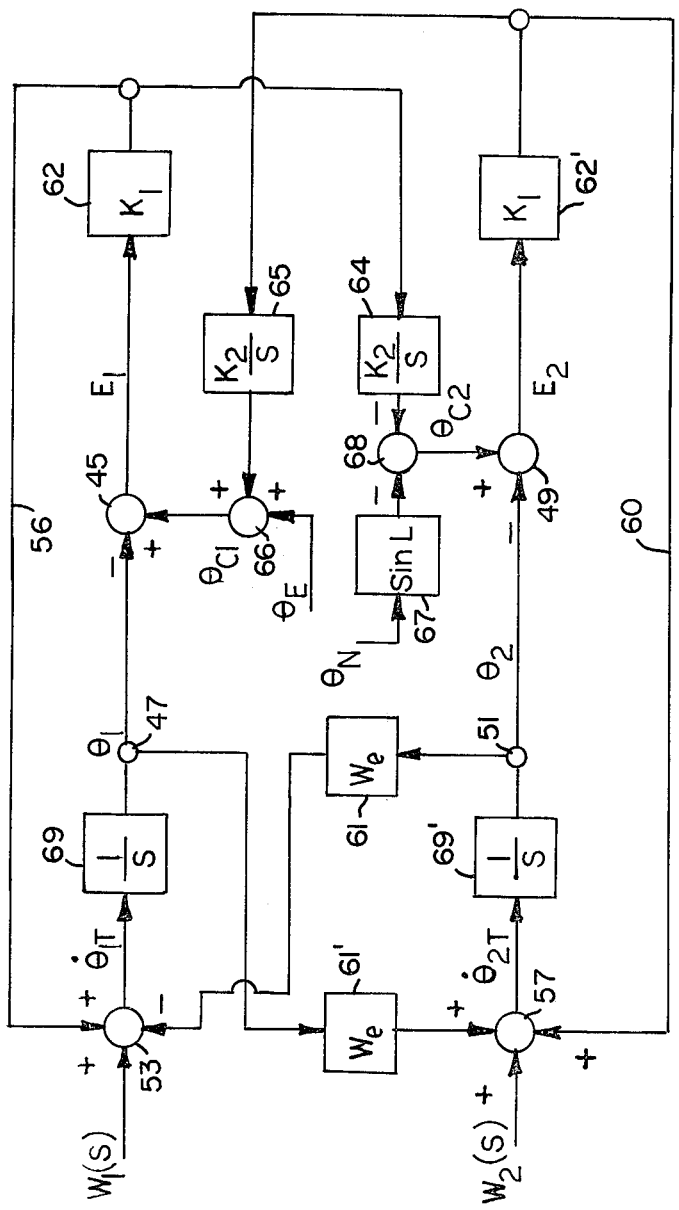
FIG. 4 is a simplified functional block diagram of the basic "North seeking" gyrocompass system shown in FIG. 3.

Using equations 7 and 9 with FIG. 3, the functional block diagram of FIG. 4 may be obtained. Here $K_1$ has been substituted for the function $Tx(S)/H'$ at 62 and 62' in FIG. 3. $K_2/S$ has also been substituted for $G(S)$ in multipliers 64 and 65 in FIG. 3 and the inputs to $G(S)$ have been redefined. The physical significance of redefining the input to $G(s)$ in FIG. 4 is that the gyro torque generator currents are used as inputs to the gimbal servo drives.

From the simplied basic "North seeking" model shown in FIG. 4, the following LaPlace transform equations can be obtained:

$$\theta_1 = 1/s \, [(W_1(s) + K_1E_1 - W_e\theta_2)] \qquad (10a)$$
$$\theta_2 = 1/s \, [(W_2(s) + K_1E_2 + W_e\theta_1)] \qquad (10b)$$
$$\theta_{c1} - \theta_1 = E_1 \qquad (10c)$$
$$\theta_{c2} - \theta_2 = E_2 \qquad (10d)$$
$$\theta_{c1} = \theta_E + K_1 K_2/s \, E_2 \qquad (10e)$$
$$\theta_{c2} = - \theta_N \, \text{Sin } L - K_1 K_2/s \, E_1 \qquad (10f)$$

Solving equations 10($a$) through 10($f$) for $\theta_1$ and $\theta_2$ in terms of the gyro drifts $W_1(s)$ and $W_2(s)$; and the erection errors $\theta_E$ and $\theta_N$ results in the following expressions:

$$\theta_1 = \frac{\left\{\begin{array}{l} S(S^2 + K_1S + K^2) \, W_1(s) - (W_eS^2 + K_1KS + K^2W_e) \, W_2(s) \\ +K_1S \, (S^2 + K_1S + KW_2) \, \theta_E - K_1S^2 \, (K - W_e) \, \theta_N \, \text{Sin } L \end{array}\right\}}{D} \qquad (11a)$$

$$\theta = \frac{\left\{\begin{array}{l} (W_eS^2 + K_1KS + K^2W_e) \, W_1(s) + S(S^2 + K_1S + K^2) \, W_2(s) \\ -K_1S^2 \, (K - W_e) \, \theta_E - K_1S(S^2 + K_1S + KW_e) \, \theta \, \text{Sin } L \end{array}\right\}}{D} \qquad (11b)$$

where $$D = S^4 + 2K_1S^3 + (K_1^2 + K^2 + W_e^2) S^2 + 2K_1KW_eS + (KW_e)^2 \quad (11c)$$
$$K = K_1K_2 \quad (11d)$$

Equations 11(a) through 11(d) can also be used as the response of the rotor angles $\theta_1$ and $\theta_2$ to initial conditions by replacements in the following manner:

$$W_1(S) \Longrightarrow W_1(S) + \theta_1, \ t = 0 \quad (12a)$$
$$W_2(S) \Longrightarrow W_2(S) + \theta_2, \ t = 0 \quad (12b)$$
$$\theta \Longrightarrow \theta_R + \theta_{c1}/S, \ t = 0 \quad (12c)$$
$$\theta_N \sin L \Longrightarrow \theta_N \sin L - \theta_{c2}/S, \ t = 0 \quad (12d)$$

The solutions of equations 11(a) and 11(b) will be in the form $$\theta_{1,2} = A_1E \ \alpha^{1t} + A_2E \ \alpha^{2t} + A_3E \ \alpha^{3t} + A_4E \ \alpha^{4t} \quad (13)$$

where $\alpha_n$ are the roots of the denominator D. The roots can only be found for a particular set of constants $K_1K_2$, so the roots were obtained for the following values of the constants $K_1K_2$.

$$\begin{array}{l} K_1 = 0.01 \\ K = K_1K_2 = 0.03 \\ W_e = 7.29 \times 10^{-5} \text{ rad/sec} \end{array} \quad (14)$$

The results were:

$$\begin{array}{l} \alpha 1,2 = -2.2 \times 10^{-5} \pm j \ 6.58 \times 10^{-5} \\ \alpha 3,4 = -1 \times 10^{-2} \pm j \ 3 \times 10^{-2} \\ j = \sqrt{-1} \end{array} \quad (15)$$

From a consideration of equations 14 and 15, it will be seen that the response of the system will contain two damped sinusoids. The time constant corresponding to the value $\alpha 1,2$, is 12.65 hours, indicating that for initial conditions it would take the rotor more than a day to settle to zero. The slowness of the system shown in FIG. 4 is unacceptable for most practical applications for a gyrocompass.

It has been determined that this limitation on the response time of the double-axis, North seeking gyrocompass settling to zero was due to the cross coupling of the two axes of the gyro through the gimbal servos. To better understand why the cross coupling produces this effect, consider the system shown in FIG. 4 and assume that $\theta_1 = \theta_{c1} = 0$ and $\theta_2 = \theta_{c2} =$ some value. Under these conditions, inititially $E_1$ and $E_2$ are zero but as the earth rotates, $E_1$ will obtain a value as described previously. This signal then goes through the transfer function $(-K_1K_2/S)$ to drive $\theta_{c2}$ towards zero. However, when $\theta_{c2}$ begins to move, an error signal $E_2$ results in order to keep $\theta_2$ slaved to $\theta_{c2}$. The error signal in turn is fed back through its gimbal drive $K_1K_2/S$, and countersets a portion of the desired signal $E_1$. This negative feedback reduces the gain from $E_1$ to $\theta_{c2}$, and the resulting motion is greatly reduced. As a consequence, the settling time of the gyrocompass becomes unacceptably long.

Double-Axis NorthSeeking Gyrocompass with Decoupling Compensation Networks

In order to decouple the error signal $E_1$ from the error signal $E_2$, the present invention proposes to counterset the negative feedback so that no component of $E_1$ returns to $E_1$. The manner in which this is done is illustrated in the functional block diagram of FIG. 5 which results from adding the decoupling compensation networks to the functional block diagram of FIG. 4. From a consideration of FIG. 5, it will be seen that the cleaned up error signals $E_1'$ and $E_2'$ for introduction to multipliers 64 and 65 respectively are derived as follows. $E_2'$ is passed through a compensation network 29 to modify the signal $E_2'$ by the transfer function $f(s)$ and is then combined in summing amplifier 27 with the signal $K_1E_1$ to produce $E_1'$ at 72. Similarly, $E_1'$ is also modified by $f(s)$ by compensation network 28 and combined in summing amplifier 26 with signal $K_1E_2$ to produce $E_2'$ at 73. If $f(s)$ is chosen properly, the resulting signal $E_1'$, $E_2'$ will be free from any negative feedback component caused by $E_1$ or $E_2$ respectively. The proper form for $f(s)$, which can be implemented as per circuit number 1, table 1-1, page 26 of "Electronic Analog and Hybrid Computers", Korn and Korn, 1964, McGraw-Hill, Inc. (Library Congress Cat. 63-23389), is derived as follows.

In the foregoing discussion, the effects of cross coupling through the earth rate component $W_e$, have been neglected. The $E_1/E_2$ transfer function of FIG. 4 can be derived from the foregoing equations, and has the form $$\frac{E_1}{E_2} = \frac{K_1K_2}{S} \ \frac{(S^2 + W_e/K_2S + W_e^2)}{(S^2 + K_1S + W_e^2)} \quad (16)$$

Since the relative magnitudes of the constants are $$K_2 \sim K_1 \times 10^3 \sim W_e \times 10^5 \quad (17)$$

The numerator of equation 16 has imaginary roots and the denominator has real roots so that the equation can be rewritten in the form $$\frac{E_1}{E_2} = \frac{K_1K_2}{S} \ \frac{(S^2 + W_e/K_2S + W_e^2)}{(S + K_1)\left(S + \dfrac{W_e^2}{K_1^2}\right)} \quad (18)$$

Equation 18 in turn can be suitably approximated by the expression $$\frac{E_1}{E_2} = \frac{K_1K_2}{S+K_1} \quad (19)$$

Figure 7:
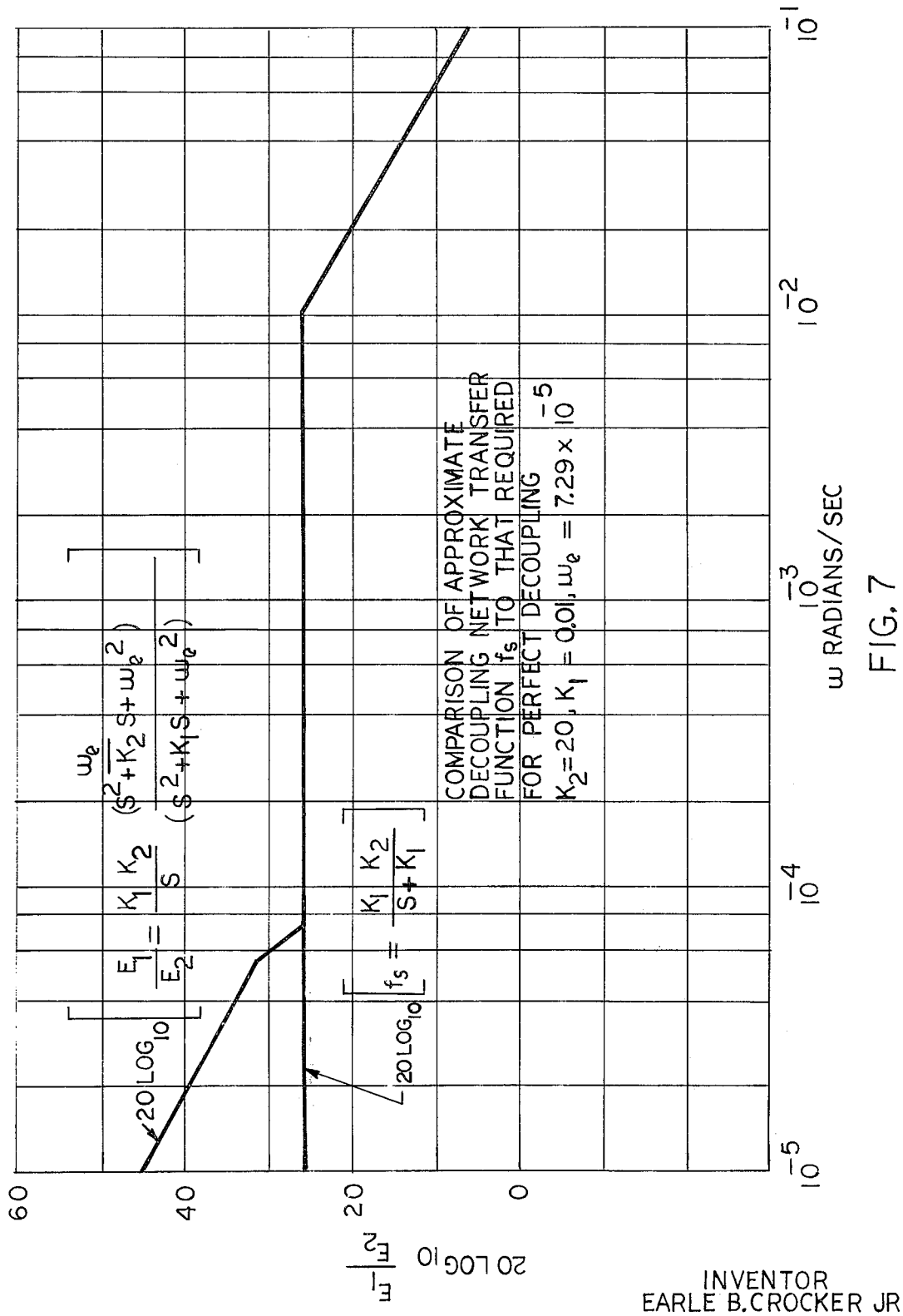
FIG. 7 is a Bode plot of the predicted operational characteristics of a decoupling compensation network made available by the invention and compares this characteristic to a characteristic required for perfect decoupling.

The Bode plot of a decoupling compensation network transfer function $$f(s) = K_1K_2/S+K_1 \quad (20)$$

is shown in FIG. 7 of the drawings and is compared to the Bode plot of a transfer function for perfect decoupling as set forth in equation 16. From FIG. 7, it will be seen that the only distinguishable deviation of the approximation set forth in equations 19 and 20 is at frequencies less than the earth rate. This means that decoupling networks with transfer functions as set forth in equations 19 and 20 will produce near perfect decoupling for reasonable settling times.

Figure 5:
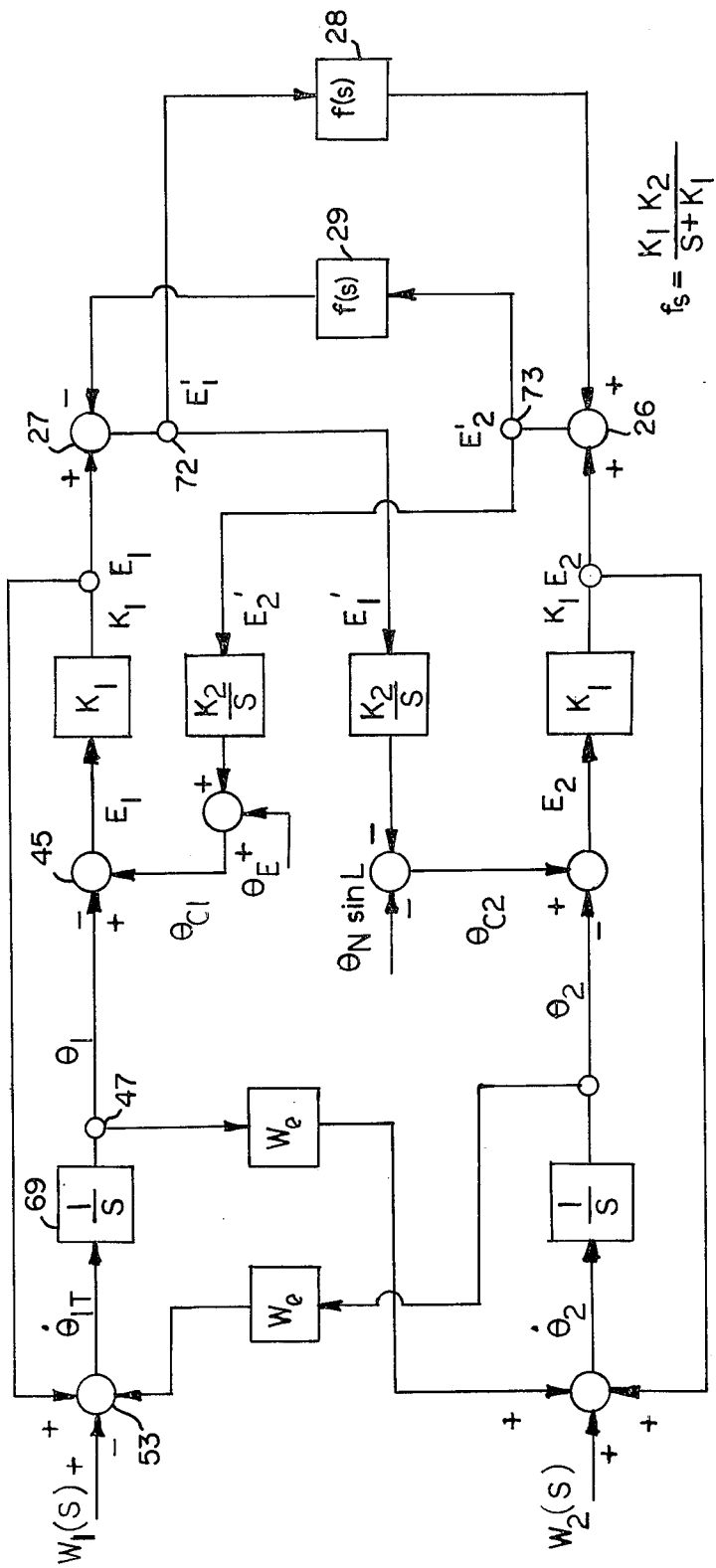
FIG. 5 is a functional block diagram of the simplified, basic "North seeking" gyrocompass system of FIG. 4 with the decoupling compensation networks of this invention added to the system.

The first step in optimizing the performance of the decoupled double-axis North seeking gyrocompass depicted in FIG. 5 was to optimize the settling time response to initial conditions with respect to the gains $K_1$ and $K_2$. This was done by making many analog computer recordings of various values of $K_2$ and $K_1$ given optimum decoupling and all initial conditions equal to one milliradian. It was found that the settling time decreased directly as $K_2$ increased if the ratio of $K_2$ to $K_1$ was held constant. The damping of the response is related to the ratio $K_2/K_1$, becoming overdamped as $K_2/K_1$ is decreased, and underdamped as $K_2/K_1$ is increased. Optimum damping occurs for $$K_2/K_1 = 2000 \qquad (21)$$

It has been determined, however, that the ratio can be in the range $$1333 < K_2/K_1 < 2700$$

and still obtain satisfactory results.

Figure 6:
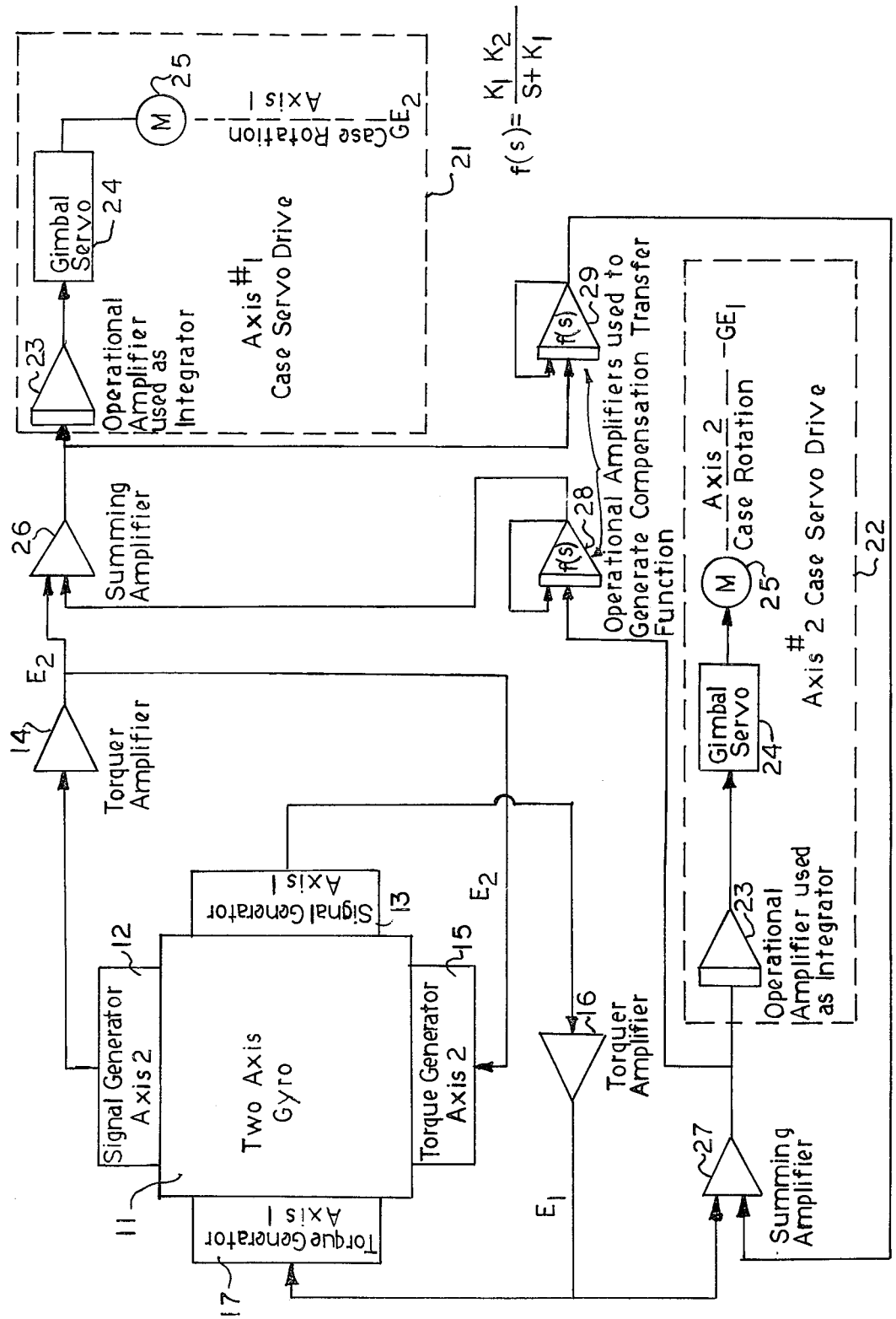
FIG. 6 is a functional block diagram of an operational mechanization of a two-axis gyrocompass constructed in accordance with the present invention and employing the decoupling compensation network made available by the invention.
Figure 9:
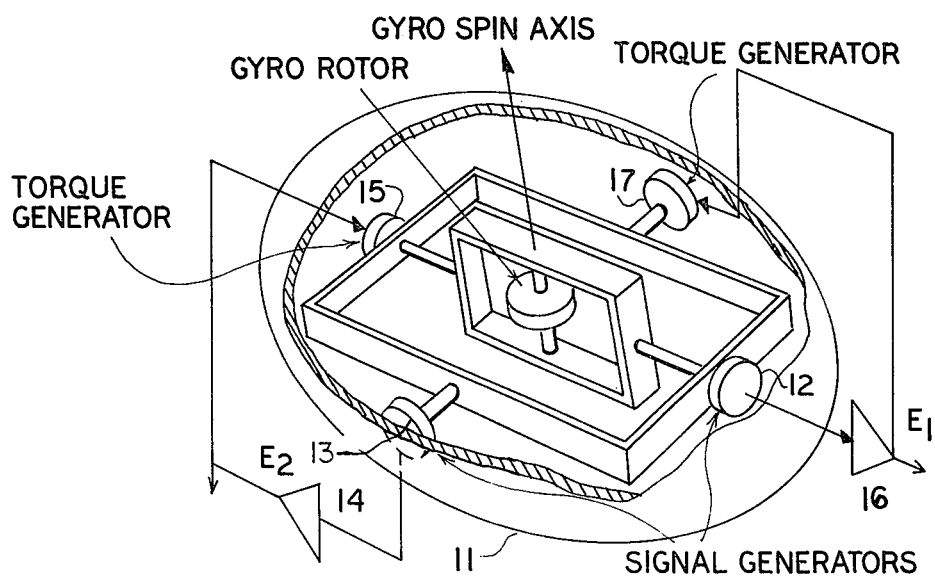
FIG. 9 illustrates a typical gyroscope and torquing electronics configuration which might be used in the gyrocompass device of FIG. 8.
Figure 5:
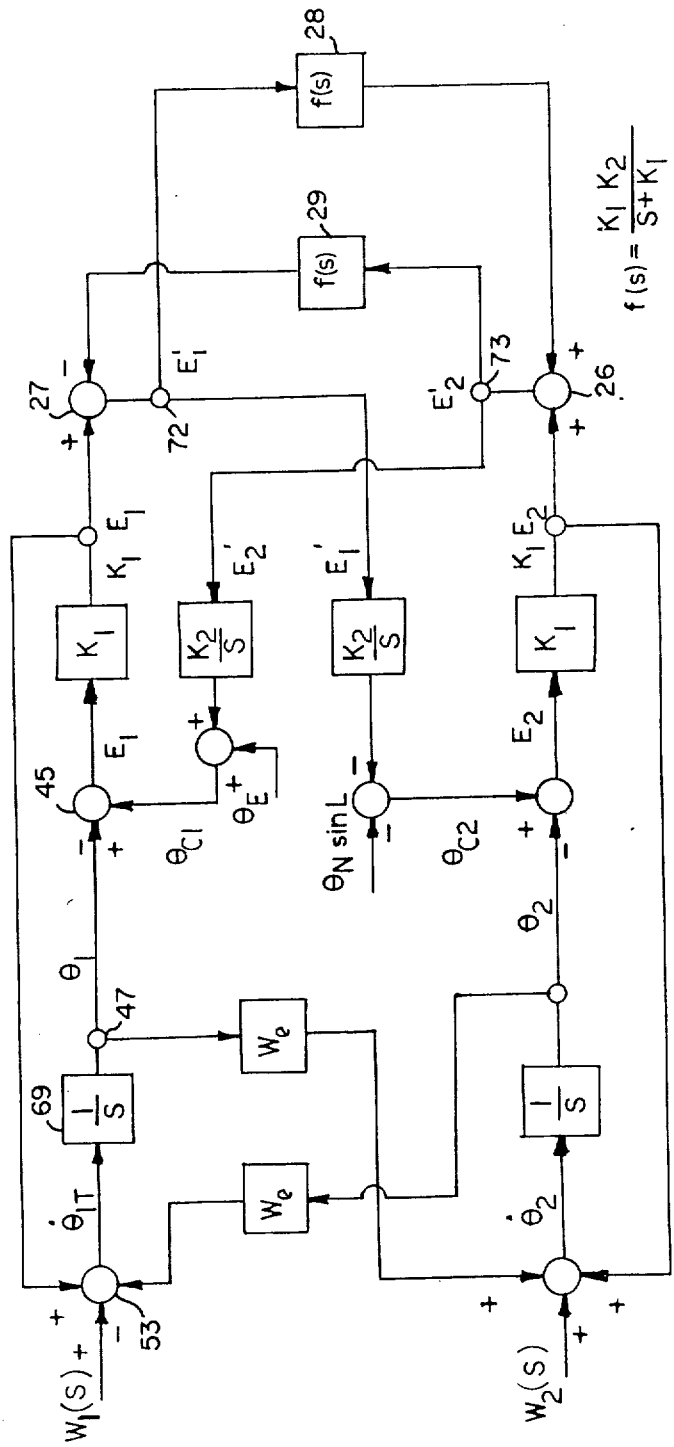
Figure 6:
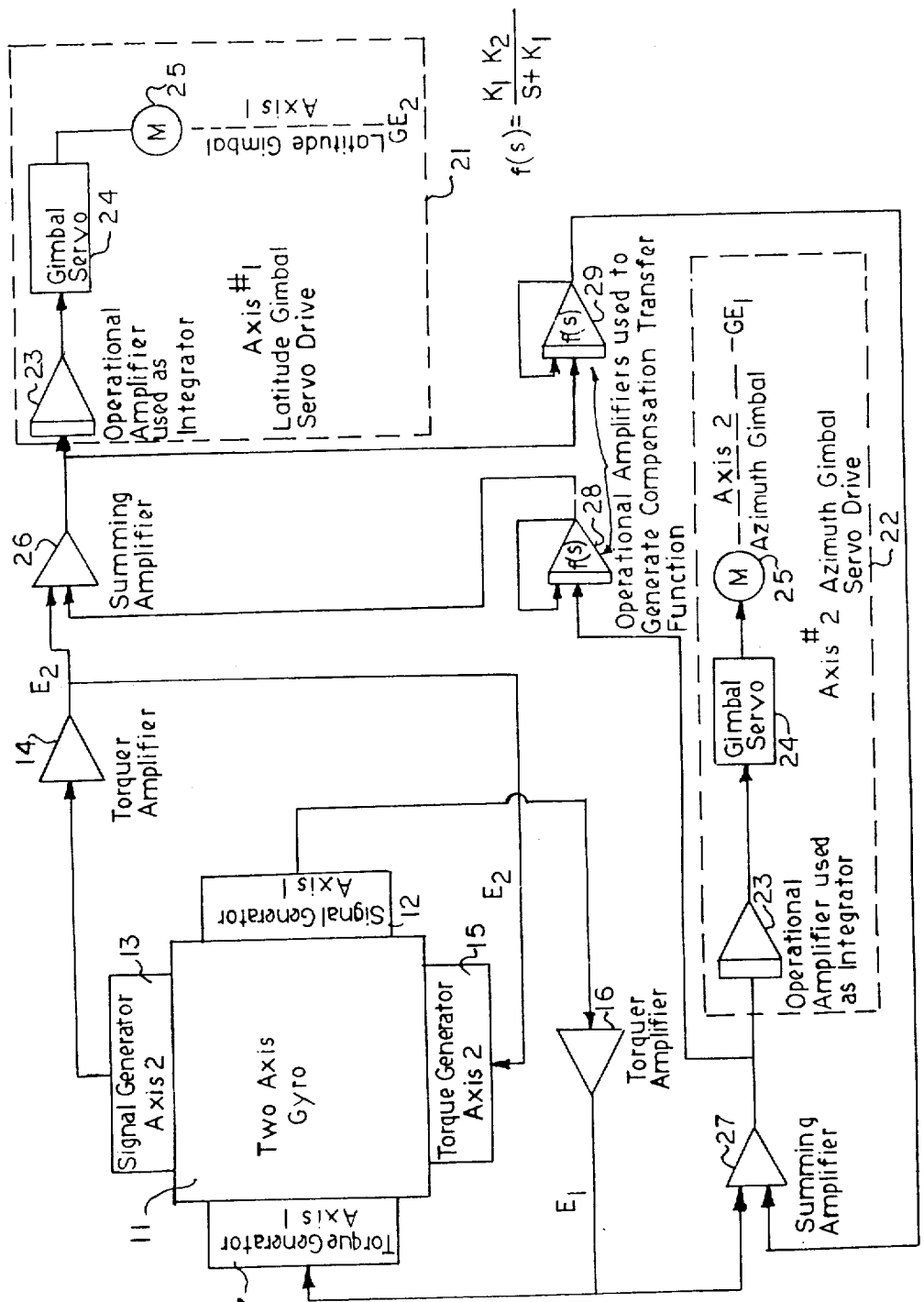

An operational, quick settling, North seeking, double-axis gyrocompass having interaxis decoupling compensation networks for improved response time is shown in FIG. 6 of the drawings. In FIG. 6, a commercially available 2° of freedom (two axis) gyroscope having characteristics already discussed is shown at 11. One example of each gyroscope is the Kearfott "Gyroflex" (Reg. T.M.). The gyroscope 11 includes an output error signal generator, in the form of pick-offs 12 and 13 respectively, for each of its input axes (axis 1) and (axis 2) to measure angular rotation of gyro rotor with respect to the case about each of the input axes. The output error signal generated by the axis 2 signal generator 13 is supplied through a convention torquing amplifier 14 and fed back to the torquing generator 15 for the axis 2. Similarly, the output error signal from signal generator 12 for axis 1 is supplied back through a torquing amplifier 16 to the torquing generator 17 for axis 1 of gyro 11. Details of the orientation and interconnection of the signal and torque generators for a typical gyro are shown in FIG. 9. The structure as thus far described is entirely conventional and employs conventional components used in slaving the gyro rotor to the gyro case.

Figure 8:
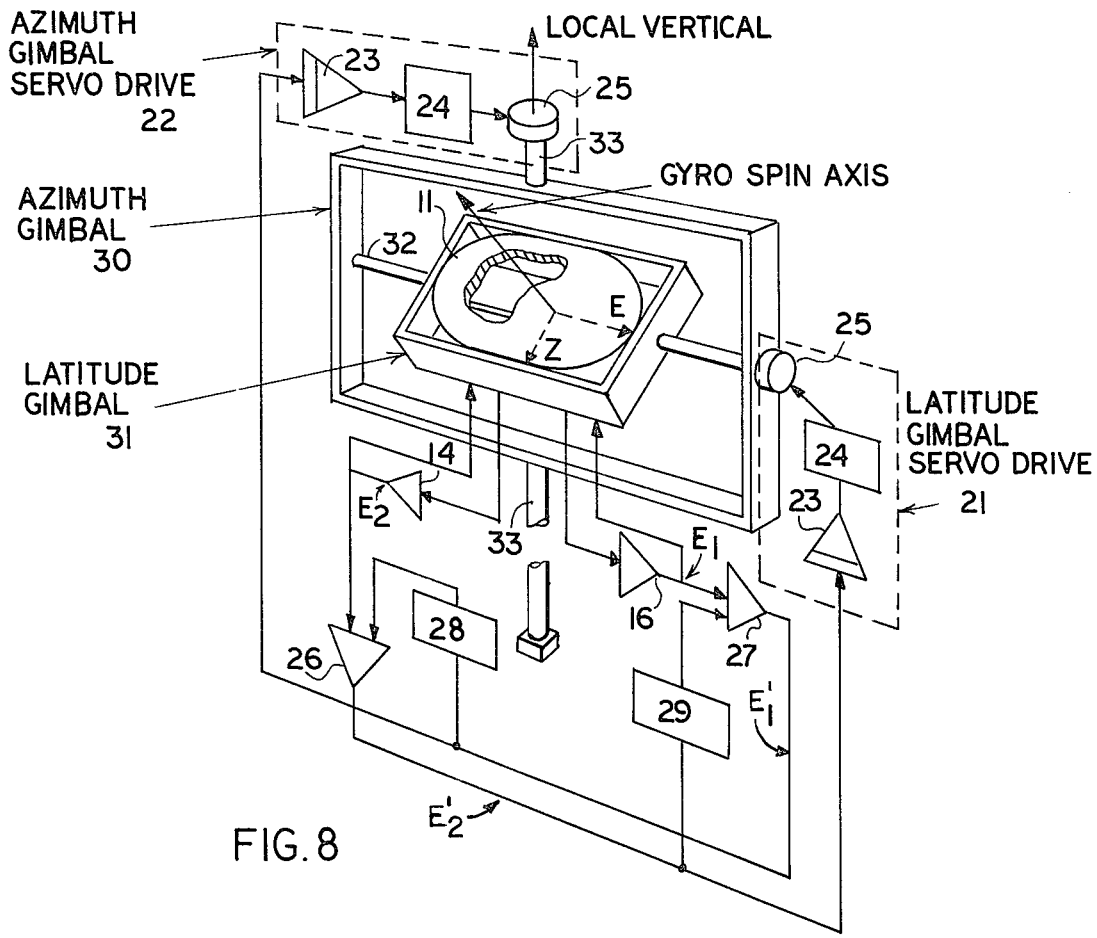
FIG. 8 illustrates the configuration of the inner two of the external gimbals of the gyrocompass system (with a functional block diagram of the circuitry) represented in FIG. 6.

The inner two gimbals of the gimbal assembly as illustrated at 30 and 31 in FIG. 8 provide for movement of the packaged gyro 11 relative to a horizontal platform stabilized by the outer two gimbals of the assembly which are not illustrated, which serve only to establish a stabilized horizontal platform and which could be replaced by other means providing such reference base. The inner two gimbals 30 and 31, as illustrated in FIG. 8, rotate about axes defined by their trunions 32 and 33, respectively, as driven by motors 25. As illustrated trunnion 33 would be journalled into the stabilized platform established, as for example, by the outer gimbals. In FIG. 8, this support is indicated by the block 35. The motors constitute a part of gimbal servo drives 21 and 22, which as depicted in FIG. 6, each includes an operational amplifier 23 used as an integrator, a conventional gimbal servo amplifier 24 and servo motor 25 for driving the gimbals. The inputs of each of the integrator-operational amplifiers 23 in each of the servo drives 21 and 22 are connected to the output of a respective summing amplifier 26 and 27. The summing amplifiers 26 and 27 are conventional summing amplifiers such as those described on pages 14–16 of the book entitled "Electronic Analog Computers" by Korn and Korn. Each of the summing amplifiers 26 and 27 has one of its inputs connected to the output of a torquing amplifier. Since as previously explained, it is necessary to drive the case, or the whole packaged gyro when viewed from the gimbal assembly, selectively about the rotor input axes, it is necessary to assign a specific association between input axes and gimbals. This same association determines which gimbal servo drive summing amplifier set is connected to each torquer amplifier. Since latitude is the angular relationship between local vertical and a line normal to the earth spin axis (as Z in FIG. 1), one gimbal is set with its axis on local vertical and is associated with the Z input axis of the gyro. Since the gimbals are at 90°, the other gimbal must lie in a horizontal plane and may be associated with the E gyro input axis. Under these conditions, as best understood from FIG. 8, the gimbal 30 aligned with the local vertical, when moved, effects changes in only the azimuth of the packaged gyro and is designated the azimuth gimbal. Similarly, the gimbal 31, when moved, effects the angle between the Z input of the gyro and the local vertical 33 which angle measures latitude. Since I have arbitrarily assigned (FIG. 6) the designation of axis one (1) to the signal and torque generators which sense and cause angular rotation of the gyro rotor about the E input axis, this is the set that generates error signal $E_1$ which indicates the angular error of the rotor about the Z axis. Correction of this error by means of the gimbal assembly requires rotation of the packaged gyro by means of the azimuth gimbal about 33. It is this pairing which determines that summing amplifier 27 has one of its inputs connected to the output of the torquer amplifier 16 to activate the azimuth gimbal servo drive (axis No. 2) responsive to signal $E_1$. The corresponding input of summing amplifier 26 receives signal $E_2$ to control the latitude gimbal servo drive 21 (axis No. 1) to rotate the packaged gyro about 32. The remaining inputs of each of the summing amplifiers 26 and 27 are connected to the output of the other summing amplifier through respective operational amplifiers 28 and 29.

The operational amplifiers 28 and 29 each have operational transfer characteristics which comprise the compensation transfer functions for processing the other axis output error signal in a manner to derive the desired decoupling compensation signals for subtraction in the summing amplifiers 26 and 27, respectively. In this manner, the desired gimbal case drive error signals, which are free of any gimbal rotation components due to its own rotation, are derived for application to the gimbal servo drives. The compensation transfer functions of each of the decoupling compensation operational amplifiers 28 and 29 are given by the expression set forth in equation 20.

In operation, the circuit of FIG. 6 functions in the following manner. Again consider that $\theta_1 = \theta_{c1} = 0$ and $\theta_2 = \theta_{c2} =$ some value. Thus, initially $E_1$ and $E_2$ are zero but as the earth rotates, $E_1$ will obtain some finite value. This signal goes through the summing amplifier 26 and gimbal servo drive 21 to drive $\theta_{c2}$ towards zero. When $\theta_{c2}$ begins to move, an error signal $E_2$ results in order to keep $\theta_2$ slaved to $\theta_{c2}$. In order to prevent the error signal thus derived from being fed back through its gimbal drive and thereby subtract off a component of the desired signal $E_1$, the circuit of FIG. 6 decouples the error signal $E_1$ from $E_2$ by subtracting off part of the negative feedback so that no component of $E_1$ returns to $E_1$. Similarly, the "cleaned up" signal $E_2$ is taken through its decoupling compensation operational amplifier 29 to subtract the negative feedback on itself from error signal $E_1$. In this manner, the "cleaned up" error signals $E_1$ and $E_2$ are used to drive the inner two gimbals until the errors are reduced to zero and the gyro rotor spin axis is parallel to the earth's spin axis.

The quick settling, North seeking, double-axis gyrocompass having interaxis decoupling compensation operates in about one-half hour settling time to provide an accurate azimuth reference. There are certain limitations in the system however of which one should be cognizant in order to derive optimum results. Due to the unsymmetry in sign in the transfer function, the settling time may vary about plus or minus 10% depending on the signs of the initial angles. The decoupling should be very near optimum in order to produce a settling time near optimum for a particular choice of $K_2$, assuming $K_2/K_1$ optimum. For example, about plus or minus 2% gain error in the decoupling loop for $K_2 = 20$ is the limit. The sensitivity of the system to non-optimum decoupling is directly proportional to the gimbal drive gain $K_2$, or for a faster system more perfect decoupling is necessary. Due to the somewhat separate action of the two axes, the worst case of non-optimum decoupling occurs for decoupling networks off the same way, i.e., both $f(s)$ gains are low.

In FIG. 8 there is shown an electromechanical diagram depicting orientation of the inner two gimbal configuration described above with reference to FIG. 6. The same numerical identification of components has been retained where possible to assist with understanding the details of construction and operation of said gimbals and the associated gimbal servo means when operating in a "North seeking" mode. Accordingly, it will be remembered from the previous description for said North seeking mode of operation that the two outermost gimbals of the fourgimbal assembly (not shown) serve to hold the azimuth gimbal axis 33 in a nominally vertical direction. In FIG. 8, 11 represents the packaged gyro supported in the latitude gimbal with the orientation of the gyro indicated by rotor axes. The lines emerging from 11 represent outputs of the signal generators (pick-offs) on the gyro input axes. The lines returning to packaged gyro 11 represent the inputs to the torque generators on each gyro input axis. The interconnections between the signal generators and torque generators are shown in FIG. 9 for a typical gyroscope which might be used in this gyrocompass. The error signals generated from the E and Z input axes of the gyro as paired with azimuth gimbal 30 and latitude gimbal 31 are supplied to the gimbal servo drive means in order to drive said gimbals until said error signals have been nulled. The inner two gimbals 30 and 31 of the gimbal provide two degrees of freedom by permitting rotational movement about axes 32 and 33. The latitude gimbal servo drive 21 operates its servo motor with the output signal of summing amplifier 26, said summing amplifier being supplied with an input signal from torquing amplifier 14 which signal also is used within the packaged gyro to maintain alignment of rotor and case about the Z axis. Similarly, the summing amplifier 27 has its output connected to the azimuth gimbal servo drive 22. One input signal to summing amplifier 27 is supplied by the output signal from torquing amplifier 16 which signal also is used within the packaged gyro to maintain alignment of rotor and case about the E axis. A further electrical interconnection is made by the use of a compensation network 28, 29 between the tow paired channels described for subtracting from signals driving the gimbals that portion of the error signals $E_1$ and $E_2$ which was caused by movement of the gimbal assembly. The corrected $E_1'$ and $E_2'$ produced by amplifiers 27 and 26 would therefore more accurately represent angular rates about the gyro input axes caused by earth rotation. These angular rates are measurements of the misalignment of the gyro spin axis and the earth spin axis. The actual interconnection made is that which permits applying to an input of each of the summing at 28, 29 amplifier 26, 27 a signal which is the output of the other modified by a function, $f(s)$, approximating the transfer function between that other output signal and the gyro error signal fed to the summing amplifier in question; e.g., the input to 27 is the output of 26 modified by $f(s)$ at 29 and $f(s)$ approximates the transfer function between the output of 26 and signal $E_1$.

FIG. 9 illustrates a typical gyroscope and torquing electronics configuration which might be used in this gyrocompass. For purpose of illustration, a two degree of freedom gimbaled gyroscope is shown. Any two degree of freedom gyroscope including a signal generator and torque generator for each gyro input axis could be used equally as well. The gyroscope shown in FIG. 9 consists of a rotor supported in an inner gimbal which in turn is supported in an outer gimbal which is supported by the gyro case. The rotational axis of the outer gimbal corresponds to the Z input axis of the gyro (axis No. 2) and the rotational axis of the inner gimbal corresponds to the E input axis of the gyro (axis No. 1). In order to maintain the gyro rotor aligned with the case about the E input axis, the signal from signal generator 12, which measures rotation of the rotor with respect to the case about the E input axis, is used with torquing amplifier 16 and torque generator 17 to apply torque to the rotor about the Z input axis, thus causing precession of the rotor about the E input axis. Similarly, in order to maintain the gyro rotor aligned with the case about the Z input axis, the signal from signal generator 13, which measures rotation of the rotor with respect to the case about the Z input axis, is used with torquing amplifier 14 and torque generator 15 to apply torque to the rotor about the E input axis thus causing precession of the rotor about the Z input axis. The outputs of torquing amplifiers 16 and 17 are then proportional to the rate of rotation of the gyro case (and rotor since it is slaved to the case) about the gyro input axes E and Z respectively.

From the foregoing description, it will be appreciated that the invention provides a new and improved quick settling, accurate, North seeking, double-axis gyrocompass having interaxis decoupling compensation for providing improved response times. The gyrocompass employs a two degree of freedom (two axis) gyroscope connected in a North seeking configuration and a novel decoupling compensation circuit interconnected between the respective outputs of the two axes for eliminating inherent cross coupling between the two axes and thereby improves the settling times of the gyrocompass without adversely affecting its accuracy.

Having described one embodiment of a new and improved quick settling gyrocompass having interaxis decoupling compensation for improved response times, and which is constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

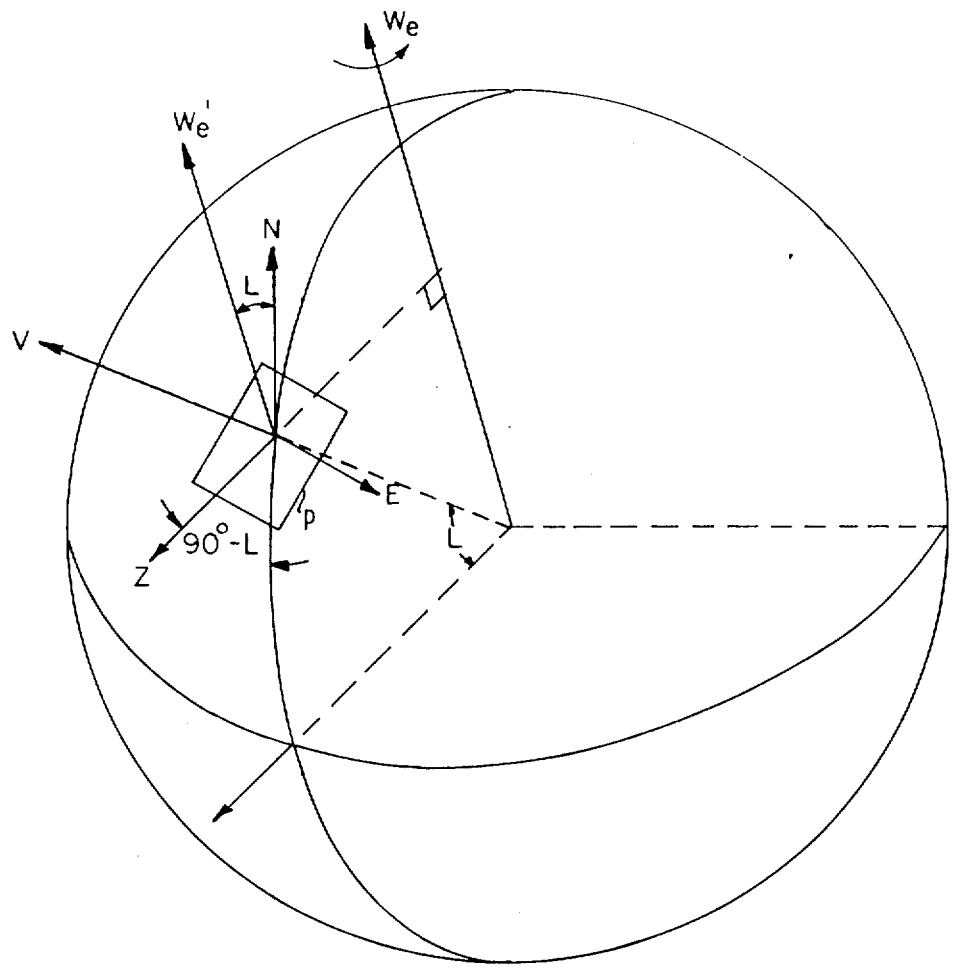
FIG. 1
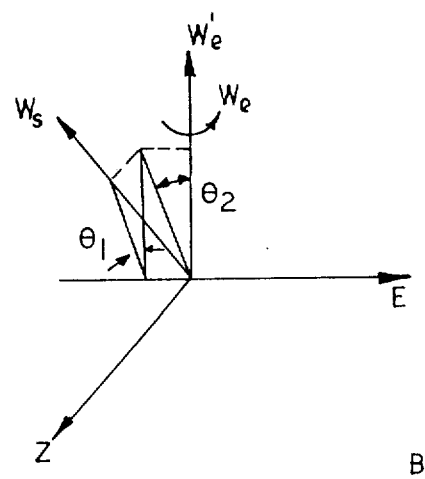

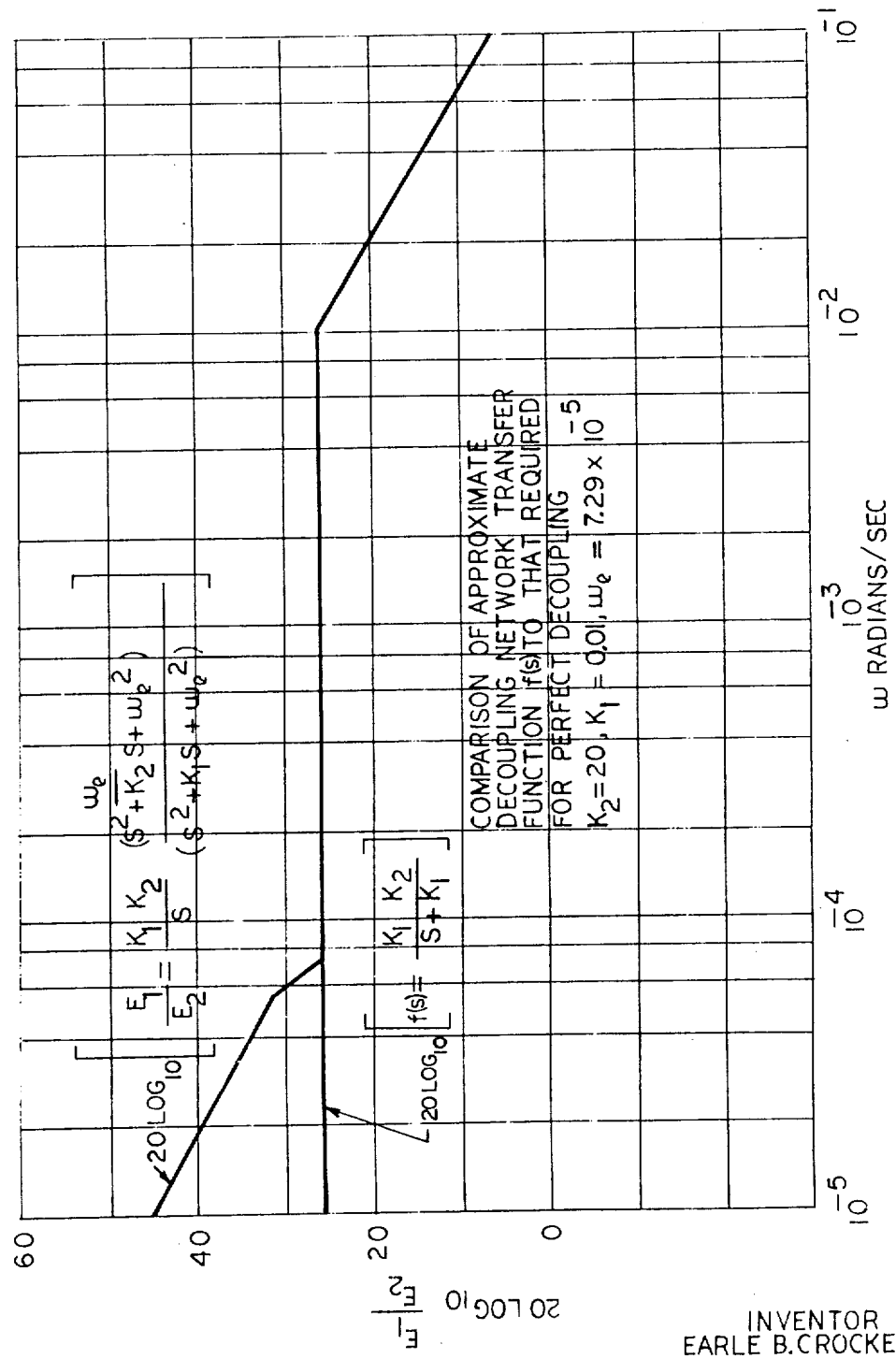

What is claimed as new & desired to be secured by Letters Patent in the United States is:

1. A quick settling, accurate gyrocompass comprising a packaged gyroscope having a case and rotor, said rotor having a spin axis and two orthogonal input axes about which motion takes place in aligning the spin axis, said gyroscope also including error signal generators (12, 13) and torquing generators (15, 17) for sensing and causing angular motion of the rotor about each input axis with respect to the spin reference axis of the case; external plural axis gimbal supporting means (30, 31) for supporting the packaged gyroscope with rotational freedom of movement about two said axes (32, 33); gimbal servo drive means (21, 22) for moving the packaged gyroscope about each said gimbal axis (32, 33); a torquing amplifier (14, 16) operatively coupled between the error signal generator and the torquing generator for motion about each input axis of said gyroscope for amplifying the error signals and for transmitting those signals to the torquing generator (15, 17) to drive the gyroscope rotor about said input axes to maintain alignment of the rotor and the gyroscope case to null any error signal due to a difference in alignment between the rotor spin axis and the spin reference axis of the case; a signal summing means (26, 27) coupled to the output of each torquing amplifier (14, 16); said gimbal servo drive means (21, 22) including motors (25) for driving said gimbal means and circuit means coupled to the output of each summing means (26, 27) for deriving signals of suitable polarity and magnitude for driving said motors to align the gyro spin axes with the earth's axis; and compensation circuit means (28, 29) connected between the output of each summing means (26, 27) and the input of the other summing means to cause said summing means to subtract from the torquing amplifier output a signal representing that component of the rate of rotation of the packaged gyro about its input axes which is due to gimbal rotation.

2. A quick settling, accurate gyrocompass according to claim 1 wherein said compensation circuit means comprises electronic means for introducing to each summing means a signal which is the output of the other summing means modified by the transfer function between that output and the error signal already introduced, said electronic means having two channels wherein each channel has one of the two possible transfer functions as its operational characteristic.

3. A quick settling, accurate gyrocompass according to claim 2 wherein the transfer function is given the expression $f(s) = K_1 K_2/S + K_1$
where $K_1$ and $K_2$ are constants and $K_2 \sim K_1 \times 10^3 \sim W_e \times 10^5$, $W_e$ is the earth's rate, and S is a LaPlace transform operator.

4. A quick settling, accurate gyrocompass according to claim 1 wherein said plural axis gimbal supporting means (30, 31) comprises a two-gimbal device mounted on a stabilized platform wherein one said gimbal (31) has its axis (32) of rotation in a horizontal plane and the other said gimbal (30) has its axis (33) of rotation normal to said horizontal plane.

5. A quick settling, accurate gyrocompass according to claim 4 wherein said compensation circuit means comprises electronic means for introducing to each summing means a signal which is the output of the other summing means modified by the transfer function between that output and the error signal already introduced, said electronic means having two channels wherein each channel has one of the two possible transfer functions as its operational characteristic.

6. A quick settling, accurate gyrocompass according to claim 5 wherein the transfer function is given by the expression
$f(s) = K_1 K_2/S + K_1$
where $K_1$ and $K_2$ are constants and $K_2 \sim K_1 \times 10^3 \sim W_e \times 10^5$, $W_e$ is the earth's rate, and S is a LaPlace transform operator.

7. In a gyrocompass having a gyroscope mounted on a gimbaled structure and wherein the gyroscope has a spin axis, two orthogonal input axes and electronic means to produce error signals indicating misalignment of the spin axis of the gyroscope with the earth spin axis, the gimbaled structure has electronic means responsive to said error signals for orienting the whole gyroscope, and there are circuit means interconnecting said electronic means for transmission of said error signals; the improvement comprising an electronic compensation network added to said circuit means for receiving and processing said error signals by removing from said error signals that portion caused by movement of said gimbaled structure whereby erection of said gyroscope is facilitated and time of settlement may be reduced.

8. The gyroscope of claim 7 wherein said electronic means to produce error signals produces two such signals which measure the misalignment as angular rates about the two input axes of the gyroscope, said circuit means also includes a signal summing means responsive to each of said error signals and said gimbaled structure has two degrees of rotational freedom and wherein said compensation network further comprises electronic means attached to the output and an input of each said summing means and introduces to the input of each said summing means a transformed signal which is the output of the other said summing means transformed by the transfer function between said output and the error signal to which the one said summing means is responsive.

9. A gyrocompass according to claim 8 wherein the transfer function of the electronic means is given by the expression
$f(s) = K_1 K_2/S + K_1$
where $K_1$ and $K_2$ are constants and $K_2 \sim K_1 \times 10^3 \sim W_e \times 10^5$, $W_e$ is the earth's rate and S is a LaPlace transform operator.

* * * * *

UNITED STATES PATENT OFFICE
CERTIFICATE OF CORRECTION

PATENT NO. : 3,938,256
DATED : February 17, 1976
INVENTOR(S) : Earle B. Crocker, Jr.

It is certified that error appears in the above-identified patent and that said Letters Patent are hereby corrected as shown below:

FIGURES 1, 2, 5, 6 and 7 of the Drawings should appear as shown on the attached sheets.

Signed and Sealed this

Twentieth Day of July 1976

[SEAL]

Attest:

RUTH C. MASON
Attesting Officer

C. MARSHALL DANN
Commissioner of Patents and Trademarks